(12) United States Patent
Bacca et al.

(10) Patent No.: US 11,954,196 B2
(45) Date of Patent: Apr. 9, 2024

(54) MUTUAL AUTHENTICATION OF A USER-CONTROLLABLE DEVICE OR SYSTEM CONTAINING SENSITIVE OR CONFIDENTIAL

(71) Applicant: LEDGER, SAS, Paris (FR)

(72) Inventors: Nicolas Bacca, Paris (FR); Olivier Tomaz, Orsay (FR)

(73) Assignee: LEDGER, SAS, Paris (FR)

( * ) Notice: Subject to any disclaimer, the term of this patent is extended or adjusted under 35 U.S.C. 154(b) by 0 days.

(21) Appl. No.: 17/051,519

(22) PCT Filed: Apr. 30, 2019

(86) PCT No.: PCT/FR2019/000064
§ 371 (c)(1),
(2) Date: Oct. 29, 2020

(87) PCT Pub. No.: WO2019/211533
PCT Pub. Date: Nov. 7, 2019

(65) Prior Publication Data
US 2021/0240813 A1    Aug. 5, 2021

(30) Foreign Application Priority Data
Apr. 30, 2018   (FR) ..................... 1870507

(51) Int. Cl.
*H04L 29/06*   (2006.01)
*G06F 21/31*   (2013.01)
(Continued)

(52) U.S. Cl.
CPC .............. *G06F 21/44* (2013.01); *G06F 21/31* (2013.01); *G06F 21/6245* (2013.01); *G06F 2221/2103* (2013.01)

(58) Field of Classification Search
CPC ................................ G06F 21/44; G06F 21/31
See application file for complete search history.

(56) References Cited

U.S. PATENT DOCUMENTS

| 3,905,461 A | 9/1975 | Davies et al. |
| 2002/0091938 A1* | 7/2002 | Hiltunen ............... G06F 21/645 726/4 |

(Continued)

FOREIGN PATENT DOCUMENTS

| EP | 2 278 538 A1 | 1/2011 |
| EP | 2 431 904 A1 | 3/2012 |

(Continued)

OTHER PUBLICATIONS

International Search Report dated Jun. 21, 2019, issued in PCT Application No. PCT/FR2019/000064, filed Apr. 30, 2019.

*Primary Examiner* — Jason K Gee
(74) *Attorney, Agent, or Firm* — Workman Nydegger

(57) ABSTRACT

Method of mutual authentication of a controllable electronic device (DE) and of its user (USER) able to control it so that it procures him a service (DS), the device (DE) containing sensitive or confidential data (DA) and being arranged so as to—in an operational phase (OP) including a preliminary step of authentication of the user (UAP)—, execute an operation (SO) so as to procure the service (DS), including, furthermore, a prior phase of authentication of the device (SDAP), in which the authenticity of the device (DE) is verified, so that if on completion of the prior phase of authentication of the device (SDAP), the device (DE) is confirmed to be authentic, the user (USER) can execute the operational phase (OP), whilst if the device (DE) is not confirmed to be authentic, the user (USER) can prevent the execution of the operational phase (OP).

5 Claims, 1 Drawing Sheet

(51) Int. Cl.
*G06F 21/44* (2013.01)
*G06F 21/62* (2013.01)

(56) References Cited

U.S. PATENT DOCUMENTS

| | | | |
|---|---|---|---|
| 2004/0177280 A1 | 9/2004 | Hiroshi et al. | |
| 2013/0081101 A1* | 3/2013 | Baer | G06F 21/577 |
| | | | 726/1 |
| 2013/0347129 A1* | 12/2013 | Samuelsson | G06F 21/40 |
| | | | 726/28 |
| 2016/0241556 A1* | 8/2016 | Jakobsson | G06F 21/36 |

FOREIGN PATENT DOCUMENTS

| | | |
|---|---|---|
| EP | 3 035 640 A1 | 6/2016 |
| FR | 2893732 A1 | 5/2007 |
| FR | 2998687 A1 | 5/2014 |

\* cited by examiner

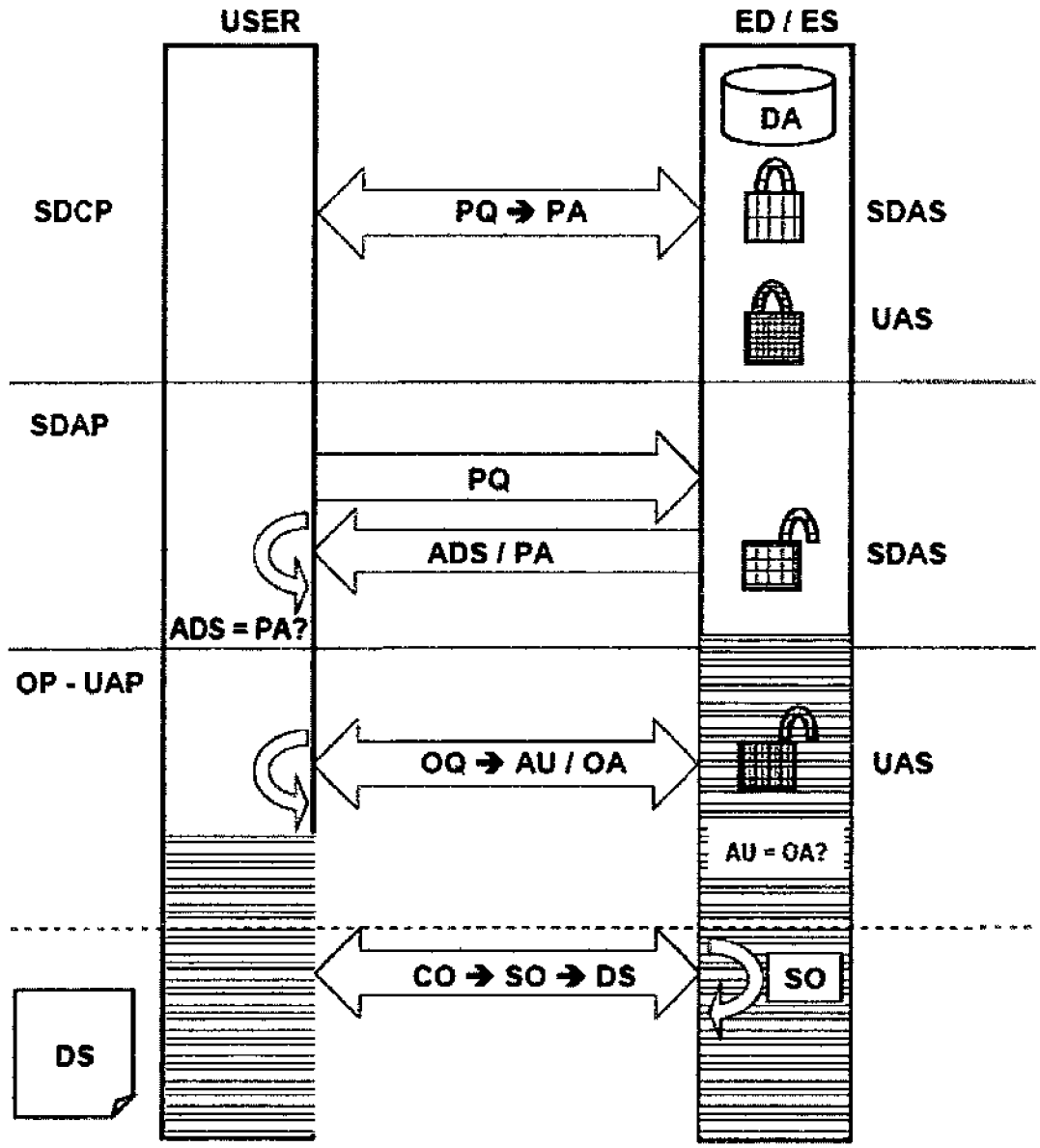

MUTUAL AUTHENTICATION OF A USER-CONTROLLABLE DEVICE OR SYSTEM CONTAINING SENSITIVE OR CONFIDENTIAL

BACKGROUND OF THE INVENTION

1. The Field of the Invention

The invention relates to the authentication of a device or a system containing sensitive or confidential data and its purpose, more specifically, concerns a method for the mutual authentication of a device or a functional electronic system (also computerized and communicational), controllable by a user, a method of operating such a device or such a system, and a device or a system specifically designed for the implementation of the authentication method or the method of operation.

2. The Relevant Technology

In the context of the invention, the expression "functional electronic device" is to be understood as being, for example, a payment terminal, while the expression "functional electronic system" is to be understood as being a functional assembly comprising several devices which can be functionally associated with each other, in particular as a functional chain, such as, for example, a payment terminal and a remote server.

The term "functional", when qualifying such a device or system, should be understood to mean, in the broad sense, that, during an operational phase, it functions to perform a particular operation (which can also be called a task, transaction, or similar), said operation being specific and likely to ultimately provide the user with a determined service, such as an order, a payment or similar.

The term "controllable" associated with that user and in relation to a device or a system, should be understood to mean that this device or this system is arranged such that its operation is initiated by the user, in particular during the operational phase.

The terms "device" and "system" simply mean, respectively, the functional electronic device and functional electronic system.

For the purposes of the invention, the term "authentication" is to be understood to mean a process for verifying authenticity. The term "authenticity" should be understood to mean legitimacy, conformity to what is expected, true, genuine and unquestionable, or which can be trusted. The term "mutual authentication" relating to the device or a functional electronic system controllable by a user, should be understood as relating to the verification of the authenticity of the device or system by the user and, in combination, verification of the authenticity of the user by the device or system. As such, the authentication method which is the subject of the invention firstly involves verification that the device or system is indeed the correct device or system and, subsequently, that the user is the correct user. Mutual authentication thereby aims to secure the operation and the service ultimately provided to the user, including for the user.

In the context of the invention, the term "data" should be understood as meaning any information, code, or other, which is specific and conditions the operation of the device or the system with a view to performing the specific operation to provide the user with a particular service.

The terms "sensitive" and "confidential" should be understood as qualifying data which must not be known, revealed or accessible, as the case may be, other than by the genuine device or system or by the genuine user, otherwise the operation performed and, ultimately, the service provided to the user, will not or might not be secure.

Such is the context of the invention and such is the interpretation of the terms used throughout the text.

Those skilled in the art are already familiar with authentication processes for computer and telecommunications systems. For example, a genuine user of a mobile phone equipped with a SIM card (Subscriber Identity Module) has a personal PIN code (Personal Identification Number) which protects the SIM card against unauthorized use. If necessary, a second code is provided, the PUK code (for PIN Unlock Key), which has the sole function of unlocking the SIM card when it has been blocked following a sequence of wrong entries (e.g., three). Document U.S. Pat. No. 3,905,461 describes, for example, access control equipment using a coded token provided to the genuine user. A certificate of authenticity activates a lock to ensure a secure connection as is typically the case for financial transactions and data transfers, etc. EP 2 431 904 describes an authentication system known as question/answer authentication, which uses a challenge question with verification of the answer provided to the challenge question. Document EP 3 035 640 describes a method of authenticating a first device executed by a second device using a question/answer authentication process. The simple identification, for example of a user, so as to establish his identity, does not constitute the authentication of the user (see EP 2 278 538). Likewise, the mere identification by the user of a device or system does not guarantee the user that that device or system is genuine. Therefore, if, for example, the genuine device or system has been replaced by a dummy device or system, operation of that device or system by the user will cause the user to communicate, to that device or system, a secret code or sensitive data or confidential data, or similar, which can then be retrieved by an attacker who can use it fraudulently in the place of the genuine user.

SUMMARY OF THE INVENTION

The problem addressed by the invention is, therefore, regarding devices and functional electronic systems which are controllable by a user, that of ensuring mutual authentication, that is to say, of verifying that the device or system is indeed the right device or system and that the user is indeed the right user, so that the operation performed by said device or system and, ultimately, the service provided to the user, is guaranteed to be secure, including for the user.

The invention provides a solution to this problem by providing, before the execution of an operation, which includes a step in which the device or system authenticates the user, and during which the sensitive or confidential data are accessible, a preliminary phase for the authentication of the device or system in which the user verifies the authenticity of the device or system, the operational phase being conditional insofar as it can only be carried out if, and only if, preliminary authentication of the device or system has been performed and if, during the preliminary device or system authentication phase, the device or system has been correctly authenticated by the user. Double authentication is therefore performed and the operation performed by the device or by the system is secured and, ultimately, the service is provided to the user.

The following is a description of the invention.

According to a first aspect, the invention relates to a method for the mutual authentication of a controllable functional electronic device and its user, comprising a preliminary configuration phase (SDCP) of the device (DE) defining the methods for the verification of its authenticity, the user then being able to control the device such that it provides him with a determined service, the device containing sensitive or confidential data and being arranged in such a way as to during an operational phase initiated by the user and including a preliminary step in which the user is authenticated by the device—perform a specific operation appropriate to provide the service, the method further comprising, before any operational phase takes place, a phase prior to authentication of the device in which the authenticity of the device is verified, such that:

if, at the end of the preliminary device authentication phase, the device is proven to be genuine, the user can perform the operational phase, if, at the end of the preliminary device authentication phase, the device is not proven to be genuine, the user is alerted by any means so as to be able to prevent execution of the operational phase, ensuring that first the device and then the user are authenticated and that the operation performed and the service provided are secure.

According to one embodiment, the preliminary device authentication phase is performed by the user.

According to one embodiment, the method, which includes several time-spaced operational phases, is such that a preliminary device authentication phase is performed before each operational phase.

According to one embodiment, the preliminary phase for the authentication of the device by the user is based on a question/answer authentication process, by means of a device authentication secret, involving a preliminary question sent from the user to the device and a preliminary answer to the preliminary question being sent from the device to the user, the preliminary question and the preliminary answer being secret such that they are known or accessible only to the sole genuine user, such that the authenticity of the device is only proven if, and only if, the user checks that there is equivalence between the answer given by the device to the preliminary question and the preliminary answer.

According to an alternative embodiment, if, at the end of the preliminary device authentication phase, the device is not proven to be genuine, the user can be prevented from executing the operational phase by the device itself.

According to one embodiment, the method also comprises a preliminary configuration phase in which the device is configured with the device's authentication secret (SDAS).

According to one embodiment, the preliminary device authentication phase is performed by the user.

According to one embodiment, the device is configured with the preliminary question and the preliminary answer on the basis of a question sent by the user using a question-to-answer generation process.

According to one embodiment, the preliminary device authentication phase is executed after the preliminary configuration phase has been executed, under the condition that no other preliminary authentication phase or operational phase of the device has been executed in the meantime.

According to the embodiments, the preliminary device authentication phase is executed after the preliminary configuration phase has been executed, under the condition that other preliminary authentication phases or operational phases of the device have been executed in the meantime.

According to the embodiments, a preliminary configuration phase is necessarily and sufficiently combined with, either a single preliminary device authentication phase or a pre-set plurality of successive preliminary device authentication phases, or an unlimited plurality of successive preliminary device authentication phases.

According to one embodiment, the preliminary step in which the device authenticates the user is based on a user authentication secret, which is an operational answer from the user to the device, which is secret so as to be known and accessible only to the sole genuine user, such that the authenticity of the user is proven if, and only if, the device verifies that there is equivalence between the answer provided by the user and the operational answer.

According to one embodiment, the preliminary question and the operational answer are different.

According to one embodiment, the method comprises a step in which sensitive or confidential data are deleted from the device, this being executed automatically at the end of a pre-set number of executions of successive preliminary device authentication phases in which the device has not been proven to be genuine. In particular, the step involving the deletion of sensitive and confidential data also erases the preliminary question and the preliminary answer when, at the end of a pre-set number of executions of successive preliminary phases for the authentication of the device or the system, the user has failed to provide the preliminary question corresponding to the preliminary answer, such that the device or system will assume that the user is not the genuine user.

According to a second aspect, the subject of the invention is a method for the operation of a functional electronic device by a user that can be controlled by the user, such that it provides him with a particular service, the device containing sensitive or confidential data, wherein, during an operational phase initiated by the user and including a preliminary step for the authentication of the user by the device, the device performs a specific operation suitable for providing the service, the operating method further comprising, before any operational phase, a preliminary device authentication phase in which the authenticity of the device is verified, such that:

if, at the end of the preliminary device authentication phase, the device is proven to be genuine, the user can perform the operational phase, if, at the end of the preliminary device authentication phase, the device is not proven to be genuine, the user is alerted by any means so as to be able to prevent execution of the operational phase, ensuring that first the device and then the user are authenticated and that the operation performed and the service provided are secure.

According to a third aspect, the subject of the invention is a functional electronic device, controllable by a user regarding a determined service, containing sensitive or confidential data, especially designed to implement the mutual authentication method and to implement the operating method described above, in particular to perform a preliminary device authentication phase.

According to one embodiment, at the end of a preliminary configuration phase the device is configured with the device's authentication secret, which is a preliminary question from the user to the device and a preliminary answer to the preliminary question from the device to the user.

As such, the device knows and combines both the authentication secret of the device and the authentication secret of the user.

According to a fourth aspect, the invention concerns a method for the mutual authentication of a functional electronic system, controllable by a user, regarding a determined service, containing sensitive or confidential data, comprising a plurality of electronic devices which are functionally associated with each other, arranged so as—during an operational phase initiated by the user and including a step in which the system authenticates the user—to perform a specific operation or series of operations appropriate for providing the service, the method comprising, moreover, before any operational phases are performed, a preliminary system authentication phase in which the authenticity of all or some of the plurality of devices that the system comprises is verified, by implementing, for each verified device, the authentication method described above.

According to one embodiment with a plurality of electronic devices forming one or more functional chains with one or more upstream devices and one or more downstream devices, the method is such that:
- if, at the end of the preliminary authentication phase of an upstream device in a chain of devices, this device is proven to be genuine, the downstream device(s) in the same chain of devices is also authenticated,
- if, at the end of the preliminary authentication phase of a device upstream of a chain of devices, this device has not been proven to be genuine, the device(s) downstream of the device in the same chain of devices will not be authenticated, the system being found not to be genuine.

According to a fifth aspect, the subject of the invention is a method for the operation of a functional electronic system by a user, that can be controlled by the user, such that it provides him with a determined service, the system containing sensitive or confidential data and comprising a plurality of electronic devices functionally associated with one another, in which—in an operational phase initiated by the user and including a preliminary step for the authentication of the user by the system—the system executes an operation or a series of specific operations appropriate to provide the service, the operating method further comprising, before any operational phase is performed, a preliminary system authentication phase in which the authenticity of all or some of the plurality of devices that the system comprises is verified, by implementing, for each verified device, the authentication method described above, such that:
- if, at the end of the preliminary system authentication phase the system is proven to be genuine, the user can perform the operational phase,
- if, at the end of the preliminary system authentication phase, the system has not been proven to be genuine, the user is alerted by any means whatsoever so as to be able to prevent the execution of the operational phase, ensuring that first the system and then the user are authenticated and that the operation performed and the service provided are secure.

According to a sixth aspect, the invention relates to a functional electronic system, controllable by a user regarding a determined service, containing sensitive or confidential data, comprising a plurality of electronic devices functionally associated with each other, as has been previously described, specially arranged for the implementation of the mutual authentication method as has been previously described, and for the implementation of the operating method as has been previously described, in particular to perform a preliminary phase to authenticate all or some of the plurality of devices that the system comprises.

BRIEF DESCRIPTION OF THE DRAWINGS

We will now briefly describe unique FIG. 1. This FIGURE is a general theoretical diagram, for purely indicative and didactic purposes, of the steps of a possible method for the operation, by a user, of a functional electronic device, controllable by the user, such that it provides him with a determined service, the device containing sensitive or confidential data, illustrating:
- firstly, a preliminary configuration phase based on a device authentication secret, performed by the user,
- subsequently, a preliminary device authentication phase, in which the authenticity of the device is verified based on the device's authentication secret,
- then, insofar as at the end of the preliminary device authentication phase, the device has been proven to be genuine, an operational phase initiated by the user and including a preliminary step for the authentication of the user by the device by means of a user authentication secret, an operational phase in which the device performs a specific operation appropriate to provide the service.

DETAILED DESCRIPTION OF THE PREFERRED EMBODIMENTS

Below are detailed descriptions of the embodiments of the invention and of different embodiments, together with examples and references to the FIGURE. This presentation is to be understood in the context of the invention and with the interpretation of the terms, as set forth above, and therefore need not be repeated.

The invention concerns and implements a functional and controllable electronic device (also computerised and communicational) ED, which contains sensitive or confidential data DA, and, more generally, a functional electronic system (also computerised and communicational) ES which comprises a plurality of devices ED forming one or more functional chains with one or more upstream devices and one or more downstream devices. As with the device ED, the system ES contains sensitive or confidential data DA. The presentation of the invention is more detailed for a device ED. It can be transposed for a system ES, namely for all or some of the devices ED that it contains, especially those containing sensitive or confidential data DA or those whose authenticity must be proven.

The invention involves a user USER who controls the device ED or system ES, by means of a command CO, such that it provides him with a determined service DS and performs the various phases or steps required for the operation of the device ED or system ES.

The aim of the invention is, with regards to either the device ED or system ES or the user USER, to ensure mutual authentication, that is to say, that the user USER can first verify that the device ED or system ES is the correct one, and then that the device ED or system ES can verify that the user USER is the correct one. It is in this way that the specific operation SO executed by the device ED or system ES and, lastly, the determined service DS provided to the user USER, are guaranteed to be secure, including for the user USER. It should therefore be understood that control of the device ED or system ES by the user USER is only possible if the device ED or system ES is genuine, and not a fictitious or illicit device or system, and when the USER user is genuine, and not a false or illicit user. If it appears that the device ED or system ES is not genuine, the user will not be able to perform the specific SO operation as he will be prevented from doing so. Likewise, if it appears that the user is not genuine, he will not be able to perform the specific operation SO as he will be prevented from doing so.

Subsequently, it is assumed that the device ED or system ES is genuine, and the user USER is genuine. The presentation of the invention explains what happens when the device ED or system ES is not genuine, and when the user USER is not genuine.

In one embodiment, the user USER is the person who is himself genuine.

In another embodiment, the user USER is an avatar of the person who is genuine. This avatar is legitimate for the operation in question and legitimately has the codes, secrets, etc. possessed by the person who is genuine, such that he can legitimately act in place of the person who is genuine.

The term "operational phase", OP, denotes a phase initiated by the user USER by the command CO, in which the device ED or system ES executes an appropriate specific operation SO specifically designed to provide the user USER with the service DS.

The term "preliminary user authentication step", UAP, denotes a preliminary step included in the operational phase OP, in which the device authenticates the user USER by means of a user authentication secret UAS.

The term "preliminary device or system authentication phase", SDAP, denotes a phase in which the authenticity of the device ED or system ES is verified by the user USER, for example by means of a device or system authentication secret SDAS.

The term "preliminary device or system configuration phase", SDCP, denotes a phase in which the device ED or system ES is configured with the device or system authentication secret SDAS. In one embodiment, configuration is done by the user USER.

The operating method of the device ED or of the system ES is such that it comprises, before any operational phase OP is performed, a preliminary device or system authentication phase SDAP, which is in addition to the operational phase OP, which is executed before it, and which conditions the ability to execute said operational phase OP. If, at the end of the preliminary device or system authentication phase SDAP, the device ED or system ES is found to be genuine, the user USER can execute the operational phase OP, whereas, if, at the end of the preliminary device or system authentication phase SDAP, the device ED or system ES is not proven to be genuine, the user USER can prevent the execution of the operational phase OP.

As such, the operating method of the device ED or system ES incorporates a method for the mutual authentication of the device ED or system ES and its user USER. In this way, first the device ED or ED system and then the user USER are authenticated. And this is how the specific operation SO performed by the device ED or ED system and the service DS provided to the user USER are secured. The invention can equally well be viewed from the angle of a method of operating a device ED or a system ES that incorporates this mutual authentication process, or from the angle of the mutual authentication process itself, intended to integrate, and be integrated into, such an operating process.

According to one embodiment, in which several operational phases are planned over time, a preliminary device or system authentication phase SDAP is performed before each operational phase OP.

In one possible embodiment, the preliminary device or system authentication phase SDAP performed by the user USER, is based on a question/answer authentication process, by means of the authentication secret of the device or of the system SDAS, comprising a preliminary question PQ from the user USER to the device ED or to the system ES and a preliminary answer PA to the preliminary question PQ from the device ED or from the system ES to the user USER. The preliminary question PQ and the preliminary answer PA are different and secret so as to be known or accessible only to the sole genuine user USER. In this way, the authenticity of the device ED or system ES is only proven if, and only if, the user USER verifies that there is equivalence between the answer ADS provided by the device ED or system ES to the preliminary question PQ, and the preliminary answer PA.

It being understood that authentication of the device or system SDAP by the aforementioned question/answer authentication process is not exclusive or restrictive. Other processes providing high-level authentication can also be considered. The invention therefore also includes embodiments based on authentication processes which are equivalent to the question/answer process. It is also understood that the preliminary device or system authentication phase SDAP may include a combination of several authentication processes, question/answer or equivalent, with the aim of providing higher authentication levels. This is how the expression, the preliminary device or system authentication phase SDAP is based on a question/answer authentication process, should be understood.

According to one possible embodiment, the configuration of the device ED or of the system ES with the device or system authentication secret SDAS (preliminary question PQ and preliminary answer PA) is executed using a question from the user USER, by way of a question-to-answer generation process, such as a function, program, or algorithm.

Several embodiments may be envisaged with regard to the interplay between the preliminary device or system configuration phases SDCP, prior to authentication of the device or system SDAP, and the operational phase OP. As such, according to one embodiment, the preliminary device or system authentication phase SDAP is executed after the preliminary device or system configuration phase SDCP has been executed, without the execution, in the meantime, of any other preliminary device or system authentication phases SDAP or operational phases OP. And, according to other embodiments, the preliminary device or system authentication phase SDAP is executed after the preliminary device or system configuration phases SDCP has been executed, by means of the execution, in the meantime, of one or more of several other preliminary device or system authentication phases SDAP or operational phases OP. Furthermore, according to the embodiments, a preliminary device or system configuration phase SDCP is necessarily and sufficiently combined with either a single preliminary device or system authentication phase SDAP or a pre-set plurality of successive preliminary phases SDAP or an unlimited number of successive preliminary phases SDAP.

The user authentication secret UAS implemented in the user authentication step UAP is an operational answer OA from the user USER to the device ED or system ES, which is secret so as only to be known and accessible to the genuine user, such that the authenticity of the user is only proven if, and only if, the device ED or system ES verifies that there is equivalence between the answer AU provided by the user and the operational answer OA.

The operational phase OP includes, on a preliminary basis, the user authentication step UAP, the latter conditioning the ability to execute said operational phase OP. If, at the end of the preliminary user authentication step UAP, the user USER is proven to be genuine, said user USER can execute the operational phase OP, whereas if, at the end of the preliminary user authentication step UAP, the user is not proven to be genuine, said user can prevent the execution of the operational phase OP.

Several embodiments can be envisaged. In one embodiment, an operational question OQ from the device ED or system ES is provided to the user USER, to which the user must respond with the operational answer OA. Or, launch of the operational phase OP itself obliges the user USER to provide the device ED or system ES with the operational answer OA. In any event, if the answer provided by the user AU and the operational answer OA are not identical, the device ED or system ES will consider that the user is not the genuine user, which will have the effect that the operation SO will not be executed and the service DS will not be provided.

As with device or system authentication, user authentication by the aforementioned question/answer authentication process is not exclusive or restrictive. Other processes providing high-level authentication can also be considered. The invention therefore also includes embodiments based on authentication processes which are equivalent to the question/answer process. It is also understood that the preliminary user authentication step UAP may include a combination of several authentication processes, question/answer or equivalent, with the aim of providing higher authentication levels.

According to one embodiment, the preliminary question PQ and the operational answer OA are different.

According to one embodiment, the method comprises a step in which the sensitive or confidential data DA are deleted from the device ED or from the system ES. The deletion step is performed automatically at the end of a pre-set number of successive executions of preliminary device or system authentication phases SDAP, in which the device ED or system ES is not proven to be genuine.

According to a complementary embodiment, the step in which the sensitive or confidential data DA are deleted from the device ED or system ES, also involves deletion of the preliminary question PQ and the preliminary answer PA when, at the end of a pre-set number of successive executions of preliminary device or system authentication phases SDAP, the user USER has failed to provide the preliminary question PQ corresponding to the preliminary answer PA, such that the device ED or system ES will consider that the user is not the genuine user.

In cases where the method concerns a system ES, before any operational phase OP, a preliminary system authentication phase SDAP is executed, in which the authenticity of all or some of the plurality of devices ED that the system ES comprises are verified, by implementing, for each verified device ED, the authentication method described above.

In such a system ES, it is possible that the plurality of devices ED form one or more functional chains with one or more upstream devices ED and one or more downstream devices ED. In this case, it may be, on the one hand, that if, at the end of the preliminary phase SDAP for the authentication of a device ED upstream of a chain of devices ED, this device ED is proven to be genuine, the downstream device(s) ED in the same chain of devices ED are also authenticated, on the other hand, if, at the end of the preliminary phase SDAP for the authentication of a device ED upstream of a chain of devices ED, this device ED is proven not to be genuine, the downstream device(s) ED in the same chain of devices ED are also not authenticated, the system ES being proven to be non-authentic.

A device ED or system ES in conforming to the invention is specifically designed to implement the mutual authentication method and the operating method described above, in particular for performing a preliminary device or system authentication phase SDAP. This device ED or this system ES is configured with—and therefore includes and combines—the authentication secret of the device or of the SDAS system, on the one hand, and the authentication secret of the UAS user, on the other hand.

We now refer to the diagram in the only FIGURE, FIG. 1. It represents the user USER and the device ED or system ES as two columns, on the left and right respectively. It shows three successive blocks stacked from top to bottom on the time axis, namely the preliminary configuration phase SDCP, the preliminary device or system authentication phase SDAS and, lastly, the operational phase OP, which is itself broken down into two blocks, the first corresponding to the preliminary user authentication step UAP and the second to the operational phase proper. As was explained previously, these two blocks can be nested to a greater or lesser degree.

The diagram illustrates that the device ED or system ES contains sensitive or confidential data DA and comprises and combines, on the one hand, the device or system authentication secret SDAS and, on the other hand, the user authentication secret UAS (symbolically represented by locked padlocks).

The diagram illustrates that these two secrets are opened successively, first the device or system authentication secret SDAS and, secondly, the user authentication secret UAS (symbolically represented by open padlocks).

The device ED or system ES, once authenticated, is indicated with horizontal stripes and, similarly, the user, once authenticated, is indicated with horizontal stripes.

The diagram illustrates that the user's command CO relating to the execution, by the device ED or system ES, of the specific operation SO intended to provide the user with the determined service DS, only occurs once, in combination, the device ED or system ES has been authenticated (by the user) and the user has been authenticated.

The invention claimed is:

1. A method for performing a transaction with an electronic device, the electronic device being configured to initiate an operational phase of the transaction upon receipt of a command from a user, and to perform, during the operational phase, a specific operation in order to provide the user with a determined service corresponding to the intended transaction, the method comprising, before the operational phase is performed:
   a configuration phase of the electronic device, comprising configuring the electronic device with one preliminary question and one preliminary answer;
   a preliminary authentication phase of the electronic device by the user, comprising:
      sending, by the user, a preliminary question to the electronic device;
      receiving, by the user, from the electronic device, an answer to the preliminary question; and
      verifying, by the user, that the answer provided by the electronic device corresponds to an expected preliminary answer,
      wherein the configuration phase is performed before preliminary authentication phase and the preliminary question and the preliminary answer are secret and supposedly known by the user, and wherein the electronic device is configured to enable the user to prevent execution of the operational phase if the user so wishes after receiving the answer from the electronic device;
an authentication phase of the user by the electronic device, comprising:
providing, by the electronic device, an operational question to the user;
receiving, by the electronic device, an answer from the user; and
comparing the user's answer with an expected operational answer;
the method further comprising deleting, by the electronic device, confidential data, if the user has failed to provide the preliminary question during a predetermined number of executions of the preliminary authentication phase of the electronic device by the user.

2. The method of claim 1, further comprising a plurality of preliminary configuration phases of the electronic device, each comprising configuring the electronic device with one preliminary question and one preliminary answer, and several operational phases over time, wherein a preliminary configuration phase of the electronic device is performed before each operational phase.

3. The method of claim 1, wherein deleting confidential data from the electronic device includes deleting the preliminary question and the preliminary answer.

4. The method of claim 1, comprising:
providing a plurality of electronic devices forming one functional chain to perform the transaction, the functional chain comprising at least one upstream electronic device and one downstream electronic device;
performing a preliminary authentication phase of the upstream electronic device; and
if the upstream electronic device is authenticated, performing a preliminary authentication phase of the downstream electronic device, otherwise not performing the preliminary authentication phase of the downstream electronic device.

5. An electronic device for performing a transaction, the electronic device being configured to initiate an operational phase of the transaction upon receipt of a command from a user, and to perform, during the operational phase, a specific operation in order to provide the user with a determined service corresponding to the intended transaction, the electronic device comprising confidential data including one preliminary question and one preliminary answer, and being configured to:
during a preliminary authentication phase of the electronic device by the user:
receive a preliminary question;
provide, as an answer to the preliminary question, the preliminary answer; and
enable the user to prevent execution of the operational phase if the user so wishes after receiving the answer from the electronic device;
during an authentication phase of the user by the electronic device:
provide an operational question to the user;
receive an answer from the user, and compare the user's answer with an expected operational answer; and
delete the confidential data if it has not received the preliminary question during a predetermined number of executions of the preliminary authentication phase of the electronic device by the user.

* * * * *